United States Patent
Brown

(10) Patent No.: US 10,320,565 B2
(45) Date of Patent: Jun. 11, 2019

(54) GENERATING AN ELLIPTIC CURVE POINT IN AN ELLIPTIC CURVE CRYPTOGRAPHIC SYSTEM

(71) Applicant: Certicom Corp., Mississauga (CA)

(72) Inventor: Daniel Richard L. Brown, Mississauga (CA)

(73) Assignee: Certicom Corp., Mississauga, Ontario (CA)

( * ) Notice: Subject to any disclaimer, the term of this patent is extended or adjusted under 35 U.S.C. 154(b) by 122 days.

(21) Appl. No.: 15/445,888

(22) Filed: Feb. 28, 2017

(65) Prior Publication Data
US 2018/0248695 A1  Aug. 30, 2018

(51) Int. Cl.
  *H04L 9/30* (2006.01)
  *H04L 9/08* (2006.01)
  *H04L 9/32* (2006.01)

(52) U.S. Cl.
  CPC .......... *H04L 9/3066* (2013.01); *H04L 9/0841* (2013.01); *H04L 9/3252* (2013.01); *H04L 9/3263* (2013.01); *H04L 2209/122* (2013.01)

(58) Field of Classification Search
  CPC ... H04L 9/3066; H04L 9/3263; H04L 9/0841; H04L 9/3252
  See application file for complete search history.

(56) References Cited

U.S. PATENT DOCUMENTS

| | | |
|---|---|---|
| 7,257,709 B2 | 9/2007 | Brown et al. |
| 7,650,507 B2 | 1/2010 | Crandall et al. |
| 8,817,974 B2 | 8/2014 | Schaffer et al. |
| 9,002,001 B1 | 4/2015 | Sun et al. |
| 9,148,282 B2 | 6/2015 | Lambert |

FOREIGN PATENT DOCUMENTS

| | | |
|---|---|---|
| EP | 2918037 | 9/2015 |
| WO | 2015023550 | 2/2015 |
| WO | 2016168925 | 10/2016 |

OTHER PUBLICATIONS

Neal R. Wagner, The Laws of Cryptography, the Finite Field GF(28), Dec. 23, 2001, http://http://www.cs.utsa.edu/~wagner/laws/FFM.html.*
Daniel Brown, ECC mod 891+5, White Paper to International Association of Cryptologic Research, Jan. 31, 2018, https://eprint.iacr.org/2018/121.pdf.*
Brown et al., ECC mod 891+5, Powerpoint presentation to CFRG Prague, Jul. 18, 2017.*
Daniel Brown, ECC mod 891+5, Aug. 1, 2017, IETF message archive, https://www.ietf.org/mail-archive/web/cfrg/current/msg09282.html.*

(Continued)

*Primary Examiner* — Robert B Leung
*Assistant Examiner* — Thomas Ho
(74) *Attorney, Agent, or Firm* — Fish & Richardson P.C.

(57) ABSTRACT

Systems, methods, and software can be used to generate elliptic curve points. In some aspect, the method includes: selecting a field size of $8^{\wedge}91+5$; selecting a curve equation that is compatible to the field size; using, by a hardware processor, the selected field size to generate an elliptic curve point; and using, by the hardware processor, the elliptic curve point in an Elliptic Curve Cryptography (ECC) operation.

8 Claims, 3 Drawing Sheets

(56) References Cited

OTHER PUBLICATIONS

Rabah et al. Elliptic Curve Cryptography over Binary Finite Fields GF(2m), Information Technology Journal 5, pp. 204-229, 2006 , ISSN 1812-5638 (hereinafter ECC).*
NP Smart,, "A comparison of different finite fields for use in elliptic curve cryptosystems", University of Bristol, Department of Computer Science, Jun. 2009, pp. 1-8.*
Daemen et al., AES Proposal, The Rijndael Block Cipher, Mar. 9, 1999, pp. 1-45.*
Bernstein et al., "How to Manipulate Curve Standards: A White Paper for the Black Hat," XP047412492, Springer, Dec. 9, 2015, 31 pages.
Extended European Search Report issued in European Application No. 18157443.5 dated Jul. 4, 2018, 7 pages.

* cited by examiner

GENERATING AN ELLIPTIC CURVE POINT IN AN ELLIPTIC CURVE CRYPTOGRAPHIC SYSTEM

TECHNICAL FIELD

The present disclosure relates to generating an elliptic curve point for a key in a cryptographic system.

BACKGROUND

In a telecommunication system, cryptographic technologies can be used to secure communications between different entities over a telecommunication network. For example, digital signature schemes can be implemented in a public key cryptographic system. One example of the cryptographic technologies is elliptic curve cryptographic (ECC). ECC can be used for encryption, digital signatures, pseudorandom generators and other security tasks.

DESCRIPTION OF DRAWINGS

Like reference numbers and designations in the various drawings indicate like elements.

DETAILED DESCRIPTION

Figure 1:
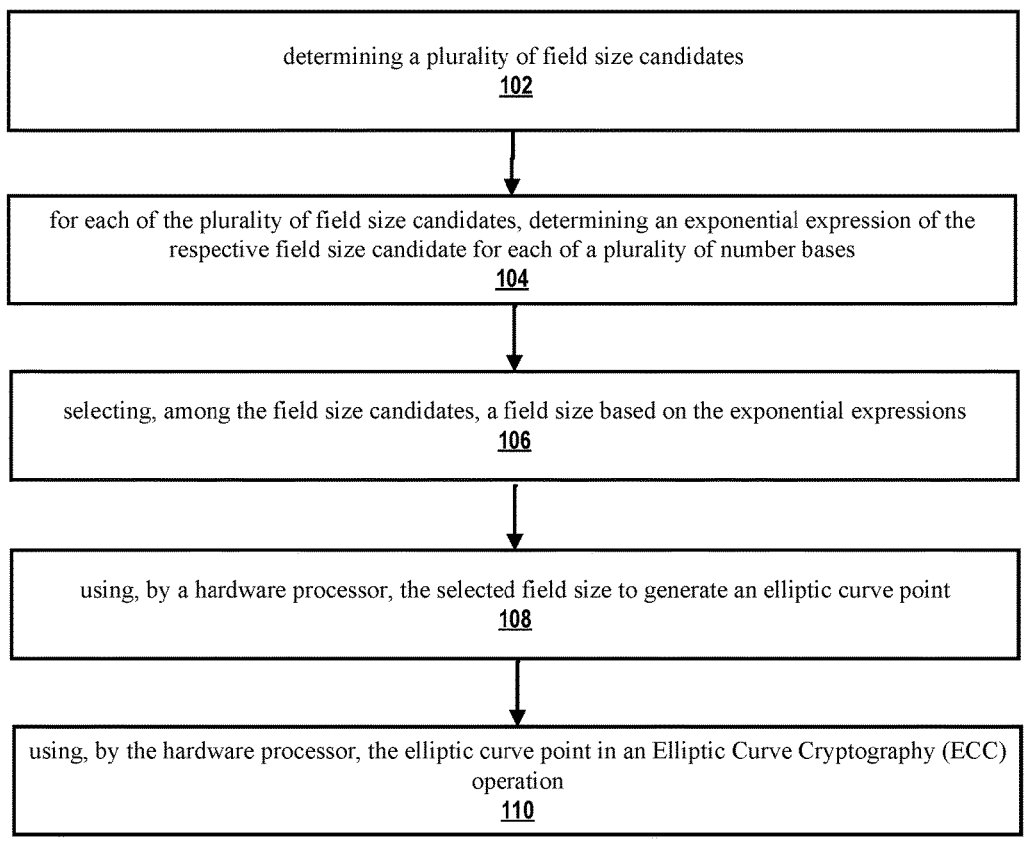
FIG. 1 is a flow diagram illustrating an example process for generating an elliptic curve point, according to an implementation.

Elliptic curve cyptography (ECC) is a cryptographic technology that provides a small key size with high security. For example, a 256-bit public key generated using ECC can provide comparable security to a 3072-bit RSA public key. ECC can thus save transmission bandwidth of a telecommunication network and memory storage of telecommunication devices. ECC has been used in the Elliptic Curve Diffie-Hellman (ECDH) protocol for exchanging keys and Elliptic Curve Digital Signature Algorithm (ECDSA) for generating digital signature.

An elliptic curve group can be described in terms of a solution to an equation over a finite field, for example, a prime finite field or a characteristic-two finite field. Each point in the elliptic curve group is a pair of field elements corresponding to a solution to an elliptic curve equation. The security of ECC depends on the ability to compute a point multiplication and the inability to compute the multiplicand given the original and product points.

In applying an ECC scheme, one or more parameters are selected. These parameters are usually shared between more than one users of the scheme, and always shared between the sender and recipient. In determining a parameter selection method, both security strengths and efficiency are considered.

One of the parameters in ECC is the finite field. A finite field is determined primarily by its size. The size of a finite field is generally a prime or a power of prime. In some cases, prime field sizes can be selected to provide because of their benefits for efficiency and security.

In some cases, a finite field of approximate size at least $2^{256}$ is considered an approximate minimum threshold of adequate security against Pollard rho attacks. A field size meeting this minimum can be used to establish a 128-bit symmetric key, without undermining the security of the 128-bit symmetric encryption scheme (such as the "Advance Encryption Standard" AES). A field size meeting this minimum may be able to withstand currently-implemented attack algorithms under foreseeable computing power. Therefore, the field size candidates should be above the minimum field size of $2^{256}$. A maximum field size is an efficiency condition. In some cases, a simplified rule of preferring a more efficient field, given a choice between two sufficient secure field sizes, can be taken. Under this rule, no specific maximum field size is set. Alternatively, a maximum field size can be set based on some estimate of minimum efficiency, minimum data usage efficiency, or an arbitrary way to converge towards interoperability and deployment. In these cases, the field size candidates should be below the maximum field size.

The security strength of a parameter depends on many factors. One factor is a concern that the parameters have been chosen to be weak, intentionally or accidentally. When a weakness in a parameter is uncommon, a particular concern is that an adversary has chosen the parameter using an exhaustive search for weak parameters. In that case, the parameter can be said to be exhaustively weakened.

One countermeasure against the risk of a potential threat of an exhaustively weakened parameter is to generate the parameter as the output of a pseudorandom function.

In some cases, a finite field that has a special form can be selected. Special form field sizes can be efficient, in some cases approximately twice as fast as random primes of approximately the same size.

However, choosing a pseudorandom prime finite field rules out choosing a special form prime, because special primes (with known efficiency advantages) are rare. So, a pseudorandom prime has a large cost in software performance. Since this decreases the usability for a given security level, the performance loss can also be viewed as a security loss. So, most standards bodies such as ANSI, NIST and CFRG recommended using special fast prime finite fields for ECC. Some other standards, e.g., the Brainpool standard, prefer pseudorandom primes. Using pseudorandom primes sacrifices on efficiency, and sacrifices on security per a given level of efficiency, but may provide a countermeasure against an attack that affects special prime finite fields in ECC.

A second countermeasure against the potential threat of an exhaustively weakened parameter is to choose the parameter as a Nothing-Up-My-Sleeve number. Unlike using a pseudorandom function, this method can be combined quite easily the preferred method of choosing a special prime.

However, most Nothing-Up-My-Sleeve numbers are chosen rather arbitrarily, without any formal quantifiable justification of their security benefit.

In some cases, as discussed in more details below, a special prime finite field size can be selected in a manner that is formally and quantifiable justifiable as resistant to exhaustive weakening. The approach of selecting the special prime finite field size described in this disclosure can also be applied to other parameters in ECC or other cryptographic systems.

In computer science, Kolmogorov complexity of data is a notion of the minimum amount of information needed to describe the data. Kolmogorov complexity can be defined in several ways. The notion is closely related to that of compressibility.

Loosely speaking, parameters are compact if the Kolmogorov complexity is the minimum possible (for the given level of security and efficiency). More precisely, to define compactness one may also define which measure of Kolmogorov complexity to use. Also, a parameter can be considered compact only if the number of parameters of the same minimum complexity is small. For example, if the minimum complexity was some value, like 20, but there were over a million parameters with complexity of 20, then the parameters might not be considered compact. Compact parameters formally resist the threat exhaustive weakening to the extent that one presumes that an exhaustive search for weak parameters would induce some kind of complexity in the exhaustive parameters. In other words, compact parameters would not resist attacks that affect the simplest parameters.

In some cases, the solution to the issue of which form of computational complexity to use for the prime defining a finite field size, is to express the field size using mathematical arithmetic, including the operations of addition, subtraction, multiplication, and exponentiation. One may also use conventional decimal notation for numbers. Such expressions may be called decimal-exponential expressions. The complexity of the expression is the number of symbols it takes to write the expression, assuming that we use one symbol to expression each arithmetic operation used. The decimal exponential complexity (DEC) of a number is the lowest complexity of any expression that evaluates to that number.

For example, the number one-thousand and twenty-four has at the two following decimal exponential expressions: "1024" and "4^5", where in the second operation, the symbol ^ indicates exponentiation. The first expression has complexity 4 (the four digits of "1204") while the second expression has complexity 3 (the symbols "4", "^" and "5"). It seems that the second expression has the least possible complexity of any decimal-exponential expression evaluating to 1024, because any shorter expression would be less than 1024. If so, then the decimal exponential complexity of 1024 is 3. We may also say that 1024 is a DEC-3 number.

Alternatively, one can consider other bases to represent numbers. Instead of decimal, one can use binary, octal, or hexadecimal. In some cases, these alternatives may be more natural than decimal because computer hardware uses binary integer arithmetic, and therefore arithmetic involving powers of two is generally more efficient than powers of other integers.

To more rigorously formalize the complexity associated with exponential expressions, we can define the syntax of expressions, which determines the types of strings that qualify as exponential expressions. We can then define semantics of the expressions, which determines how to evaluate the strings. The following is an example of analyzing a decimal exponential expression. Analysis of other number bases can be similar.

One purpose of this more formal rigorous analysis is to be able to not only precisely define complexity, but also to reason about the minimal complexity needed to define the compactness of a number.

A decimal exponential expression is a string having the alphabet of the following 17 characters, $$1\ 2\ 3\ 4\ 5\ 6\ 7\ 8\ 9\ 0\ (\ )+-*\ \hat{}\ / \tag{1}$$

The characters fall into three classes. The first 10 are digits, with 0 having a special syntactical role. The next two characters are parentheses, which may be nested and must be matched. The last five characters are operators. Following are some syntactical rules and definitions for expressions.

A numeric expression includes only digits, with the first digit nonzero. A closed expression is either a numeric expression or a valid expression that is enclosed in parentheses. A string is a valid expression if and only if it is the concatenation of an odd number of sub-strings where the odd-order sub-strings (first, third, fifth, etc.) are closed expressions and the even-order sub-strings (second, fourth, etc.) are just operators, each having a single-character.

While valid expressions and closed expressions are defined in terms of each other, both classes include numeric expressions. So, valid and closed expressions can built from smaller closed and valid expressions, and the smallest expressions in this sequence of constructions will be numeric expressions.

Three example numeric expressions are 4, 5, and 120, because they includes entirely of digits, the first of which is not 0. These numeric expressions are also valid expressions and closed expressions. An example of non-numeric valid expression includes 4+5, because: it includes an odd number, three, or sub-strings: "4", "+", "5", with the first and third substrings expressions ("4" and "5") are closed expressions, and the second substring is just one of the operator symbols. Two examples of a non-numeric closed expression are (4) and (4+5), because they are enclosed in matching parenthesis, and the enclosed substring is itself a valid expression. Finally, an example of more complicated valid expression is (4+5)*120^4, because the string can be parsed into an odd number of sub-strings alternating between closed expressions (4+5), 120 and 4, and operators * and +.

It can be useful to count the number of decimal exponential expressions of given complexity for a few reasons. First, it can help to confirm whether an exhaustive search of all possible such expressions is actually complete. Second, it can also be used to calibrate decimal expression complexity with other measures of complexity, such as bit length of a compression. Third, if there are large number of parameters with the minimum value of complexity, then we can develop a more refined notion of the complexity whose integral part is still the number of the symbol but whose fractional part is the relative index of the expression in a sorted list of expressions of the same symbol length.

One can use generating series to count numeric, closed, and valid expressions of a given length:

$$N(x)=9x+90x^2+900x^3+\ldots \tag{2}$$

$$C(x)=N(x)+x^2V(x) \tag{3}$$

$$V(x)=C(x)/(1-5xC(x)) \tag{4}$$

Using this system of equations to calculate lower-degree terms seems to yield:

$$V(x)=9x+90x^2+1314x^3+17190x^4+231849x^5+3100140x^6+\ldots \tag{5}$$

The meaning of this generating series, is that, there are there 1314 different valid DEC-3 expressions (for example). Continuing the calculations above show that there are 41572305 (over forty million) valid expressions for DEC-7 candidates.

Taking the base-2 logarithm of the coefficients of the series V provides a calibrated idea of how much Shannon entropy is encoded into a decimal expression of a given complexity. This may also allow calibration between decimal exponential complexity and the complexity to other bases, and also to other complexity measures.

The formal system above for decimal expressions is very close to mathematical notation. One difference is that it uses the operator * to represent multiplication, and it uses the symbol ^ to indicate exponentiation instead of the more superscript notation.

The system above can also be varied. In some cases, the operator for multiplication can be omitted when clear from context. In some cases, other math functions, e.g., the right unary operator "!" representing factorial can be used.

Above, we defined the syntax for decimal exponential expressions, we can also define the meaning. In particular, each decimal exponential expression should evaluate to an error, or to a number that can be considered as a possible finite field size for use in an elliptic curve cryptography (ECC) system. The following are some rules for evaluating an alternating sequence of operands and operators.

The numeric expressions have their usual meaning as a number. Parentheses have their usual meaning too: the expression within a pair of matching parentheses is evaluated on its own, and the numeric result can substitute the parenthesized expression. The operators also have their usual meaning, with "*" meaning multiplication and "^" meaning exponentiation.

For simplicity, we will assume that the/operator requires exact division, and inexact division yields an error. Similarly, a negative result in the—also produces an error. These simplifications help to ensure that during the course of evaluating an expression each substitution of the sub-string by its evaluation results in another numeric expression. These simplifications also avoid raising an integer to a negative or fractional power. Any error that occurs in the evaluation of sub-expression causes an error in the evaluation in the whole expression.

The number of evaluatable expressions, those that can be evaluated without error, is potentially much smaller than the number of valid expressions.

Finally, because valid expressions are permitted to be decomposed into and odd number of sub-strings, alternating between closed expressions, and the operators, we can also define how to deal with the case of multiple operators in such an expression. Such issues are known as operator precedence and order of evaluation. Again, we can try to follow the mathematical conventions. Consecutive "^" operators are to be evaluated first, from right to left. In other words, the exponentiation operator ^ is given highest precedence, and is right-associative. So, for example, 3^3^3 evaluates to 3^81, not 27^3. (Note that 27^3=(3^3)^3=3^9=3^(3*3) is much smaller than 3^81, so evaluating ^ from right-to-left generally helps to produce large evaluations.) As with parenthesized sub-expressions, the resulting ^-based sub-expressions are replaced by their evaluations (now quite large, generally). Next, look for group of consecutive operators consisting of the operators "*" and "/" only. In each sub-expression evaluate the operators from left-to-right. (The left-to-right ordering matches that of C programming language for these operators, and fits quite well with mathematical notation.) These multiplication-division sub-expressions are evaluated and substituted in the expression. The remaining expression then has at most tow kinds of operators + and −, which are also evaluated from left-to-right (per tradition). Below is an example list of associativity rules for these operators.

Operators Associativity
* right
*/ left
+− left Note some of these intricate semantic questions related to the evaluation of expressions may apply to longer expressions. For short expressions, such as the DEC-6 primes that we will consider for ECC, many of the details above do not arise. The expressions are so short that order of evaluation does not arise (though precedence of operators does). Even the issue of exact division, or rounded division will also not matter much for short expressions.

To aid in our analysis of decimal exponential expressions, it is helpful to have a notion of the shape of a decimal exponential expression. The shape is obtained by replacing each digit by "#" and each of the operators by "?". In some cases, we might not replace all of the digits or all of the operators (or both). In these cases, we can have a templated shape, which can be more specific than shape. Proofs about the decimal exponential can then be divided into cases by shape.

Using the generating series approach above suggests that the number of shapes of DEC-1 to DEC-7 number are 1, 1, 3, 4, 10, 16, 37.

The following list includes 16 possible shapes of DEC-6 numbers. The second column of 8 shapes uses parentheses, which may be evaluated using a combination DEC-4, DEC-2, or DEC-1 numbers. The top five elements of the first column use one or less operations, which will likely give a composite number (not the prime that we need) or a too small number (less than $2^{256}$).

(####)
?# (##)?#
?## (#)?##
?### ##?(#)
?#### #?(##)
?#?# (##?#)
?##?# (#?##)
?#?## ((##))

For example, a heuristic analysis suggests that the operator ^ helps to make expressions much larger than numeric expression of similar length. Consequently, many expressions may be too small to be used for ECC. Those with at least one occurrence of the operator * may be useful. For primes, one also needs a + or −, since products of perfect powers are not generally prime.

The DEC-1 to DEC-6 primes of size at least $2^{80}$ have a decimal exponential expression with the templated shape #^##?#. The following provides a proof.

First we can eliminate parentheses from the shape. Parentheses can be removed if they surround no operators, meaning a numeric expression (digits only). Otherwise parentheses surround at least one operator, which has at least two operands. So, a parenthetic sub-expression requires at least five symbols (the two parentheses, the operator and the two operands). For DEC-6 or shorter expressions, this leaves only one more symbol, which violates the syntax, since one symbol is not enough to hold an operator and an operand. If we include elided multiplication operators, then we see the value must be composite.

Expressions without parenthesis have a shape consisting of # and ? symbols with no two of the latter adjacent. Note, in general, the number of such shapes of a given length is a Fibonacci number. For DEC-6, the number of such shapes is 8, as seen the first column above in the list of 16 shape of DEC-6 expressions. For The largest DEC-6 expression with no operators is 999999, which is less than 1 million which is less than $2^{20}$ which is less than $2^{80}$.

An expression with only one operator cannot be prime if the operator is ^ or *, unless one of the operands is one and the other a prime with an expression of shorter length. If the single operator is + or − or /, then the largest DEC-6 expression is 9999+9, which is less than $2^{14} < 2^{80}$. Therefore, a decimal exponential expression evaluating to a prime and having length at most six and having only one operator is too small.

The only remaining expressions have two operators, because three operators require four operands and hence seven or more symbols. If both operators are in the set of * and ^, the expression would evaluate either to a composite number, or to a prime expression of even shorter length (complexity). Therefore, we can determine that at least one of the two operators is neither * nor ^.

If neither of the operators is ^ then the largest possible expression is 99*9*9, which is again too small.

So one of the operators is ^ and the other one of + or − or /.

If the second operator is ^, the expression will be too small, or the first operator will be + and the expression can be re-arranged by commutativity. Therefore, we can assume that the first operator is ^.

If the expression has the templated shape ##^#?# or #^#?#, then the largest possible expression is 99^9+9 which is less than $128^9+128^9=2^{64}<2^{80}$.

Therefore, either the second or third numeric subexpression has two digits. If it is third numeric expression, we see that the maximum possible value is 9^9+99, which is again much smaller than $2^{80}$.

This leaves only expression of the templated shape #^##?#. This completes the proof.

If the second operation is /, and, as before, if we use exact division, then evaluation would be a composite number. Alternatively, if we include more liberal evaluation semantics, in which division is evaluated by rounding, then the primes that result (if any) from expression with the templated shape #^##/# have no known efficiency advantages, so they should be preliminarily rejected. So, we can further conclude that that the only primes have the templated shape #^##+# or #^##−#.

Below are some of the DEC-6 primes are at least approximately $2^{256}$, which meets the minimum field size rule. As discussed previously, they have the shape #^##?#.

$$6^{98}-7(\approx 2^{253.3}) \quad (6)$$

$$8^{91}+5(\approx 2^{273.0}) \quad (7)$$

$$7^{98}-2(\approx 2^{275.1}) \quad (8)$$

$$9^{87}+4(\approx 2^{275.8}) \quad (9)$$

$$8^{95}-9(\approx 2^{285.0}) \quad (10)$$

$$9^{99}+4(\approx 2^{313.8}) \quad (11)$$

Two of the six primes with base b=8 are probably more efficient because they are close to a power of two. The other four primes are quite far from a power of two and thus should be rejected.

So, by using decimal exponential complexity and the current practice of preferring especially efficient primes of a minimal size we have narrowed the selection of prime finite field for use in ECC to just two choices: $8^{91}+5$ and $8^{95}-9$. This process drastically reduces the risk of exhaustive weakening. These parameters are compact, with little room for an adversary to have meddled with them.

Between the remaining two, $8^{91}+5$ and $8^{95}-9$, there is only one main reason to prefer $8^{95}-9$: its larger size. But recall, the currently best practice to choose the most efficient finite of an adequate size. Field size $8^{91}+5$ should be more efficient than $8^{95}-9$ for a few reasons. First, $8^{91}+5$ is slightly faster for ECC because uniform scalar multipliers are smaller integers. Second, Prime $8^{95}-9$ is just below a power of two, meaning that Fermat inversion is not as optimal as for $8^{91}+5$, which is just above a power of a prime. Third, a five-limb implementation, $8^{95}-9$ requires larger limb values, so it may suffer from greater overflow pressure. Therefore, finite field multiplication for may require $8^{95}-9$ more reduction steps to avoid overflowing the maximum words size of the computer.

Besides efficiency, we can also compare $8^{91}+5$ and $8^{95}-9$ using their numerical expressions in other bases. Here, because 4 digits are used to represent 9 in binary, while 3 digits are used to represent 5, we see that $8^{91}+5$ has less complexity using binary expression. Alternatively, as suggested earlier, perhaps some of kind of sorting of decimal exponentiation expressions, can be used to give a refine complexity. The sorting method is somewhat arbitrary, which means that it provides only little persuasion against exhaustive weakening, but, regardless of this caveat, the expression 8^91+5 appears before 8^95−9 in the most typical lexicographic sorting.

There are more DEC-7 primes than DEC-6 primes. Using DEC-7 primes gives one far more options. We were actually fortunate that there were only two suitable DEC-6 options to choose between, since that provides a stronger argument of compactness and of resistance against exhaustive weakening. (If there were many DEC-6 options, or there were no DEC-6 options, but many DEC-7, then we would not end up with such a persuasive argument against exhaustive weakening.)

Some noteworthy DEC-7 prime candidates include: $2^{521}-1$, $2^{255}-19=8^{85}-19$ and $2^{336}-3$. These have been considered for ECC in previous work, most for reasons of efficiency.

FIG. 1 is a flow diagram illustrating an example process 100 for generating an elliptic curve point, according to an implementation. The process 100 can be implemented by an electronic device. The example process 100, shown in FIG. 1, can be implemented using additional, fewer, or different operations, which can be performed in the order shown or in a different order.

The example process 100 begins at 102, where a plurality of field size candidates are determined. In some cases, these field size candidates include pseudo-Mersenne primes. In some cases, these field size candidates can be produced based on a search of DEC-6 and DEC-7 primes discussed previously. Alternatively or additionally, these field size candidates can be inputted through a user interface, received from another electronic device, or a combination thereof. Table 1 lists of a plurality of field size candidates.

TABLE 1 field size candidates and their numerical expressions.

| Bit-security | Decimal | Binary | Hexadecimal | Octal |
|---|---|---|---|---|
| 243 | 8^81−96 | 10^11^101−100114 | 8^51−96 | 2^3^5−118 |
| 255 | 8^85−197 | 10^11111111−1001117 | 2^FF−137 | 2^377−238 |
| 273 | 8^91+56 | 1000^1011011+10116 | 8^5B+56 | 2^421+57 |
| 285 | 8^95−96 | 1000^1011111+100117 | 8^5F−96 | 2^435−118 |
| 336 | 2^336−37 | 1000^1110000−1115 | 8^70−36 | 2^520−37 |
| 521 | 2^521−17 | 10^1000001001−115 | 2^209−17 | 2^1011−18 |
| 729 | 2^729−97 | 10^11^110−100114 | 8^F3−96 | 2^3^6−118 |

At 104, for each of the plurality of field size candidates, an exponential expression of the respective field size candidate for each of a plurality of number bases is determined. For example, as shown in Table 1, the exponential expression of each size candidate for decimal, binary, hexadecimal, and octal are shown on the same row as the respective size candidate.

At 106, a field size is selected based on the exponential expressions of the field size candidates. In some cases, the selection is performed based on the complexity index of the exponential expressions. In some cases, the complexity index represents the number of symbols used in the numerical expression. For example, the decimal complexity index for 8^85−19 is 7, while the decimal complexity index for 8^91+5 is 6. In Table 1, the complexity index of each exponential expression is listed under the respective exponential expression.

In some cases, for each field size candidate, the complexity index for each number base is calculated and summed to generate a combined complex index. The combined complexity index can index the level of implementation complex for the field size candidate. In some cases, a field size candidate with a minimum combined complex index can be selected.

In some cases, the selecting can be further based on the bit-security levels of the field size candidates. The bit-security level is the exponential of the first term in the field size candidates with respect to power of 2. For example, 8^81−9=2^243−9, therefore the bit-security level of 8^81−9 is 243. The bit-security level indicates the size of the candidates. As discussed previously, a field size of about $2^{256}$ is considered an approximate minimum threshold of adequate security against Pollard rho attacks. Therefore, the field size candidates with bit-security level below 256 may not be a suitable candidate. These field size candidates, e.g., 8^81−9, can be removed before the combined complex indices are compared.

Similarly, the field sizes with considerably larger bit-security, such as 336, 521 and 729, have a significant efficiency cost. In some cases, the most efficient parameter with adequate security is preferred. In smaller systems, however, the extra cost may be affordable. (For example, two users communicating via powerful devices.) Such alternative systems may trade some efficiency for much higher bit-security. In that, case Table 1 shows that 2^279−9 is arguably the most compact because its binary and hexadecimal exponential complexities are quite low (compared to other entries in Table 1, and compared to other large prime numbers.)

In one example, 8^91+5 is selected among the candidates listed in Table 1. 8^91+5 is about $2^{273}$ and therefore is larger than $2^{256}$. Therefore, 8^91+5 can provide sufficient complexity against Pollard rho attacks.

The reasons for preferring 8^91+5 over 8^95−9 were discussed earlier.

The remaining entry in Table 1 is 8^85−19. This entry has a size slightly below $2^{256}$, and thus may not be selected based on the minimum bit-security requirement. If the bit-security threshold is lowered from 256 to 255, then 8^85−19 may then be selected. However, the exponential complexity may be larger than that of 8^91+5, in decimal, binary, hexadecimal and octal. Decimal exponential complexity (and exponential complexity to other reasonable bases) favors 8^91+5 over 8^85−19.

In some cases, selecting a field size of 8^85−19 may be more efficient in a ECC system than 8^91+5 because it is a smaller number. However, both can be implemented using five 64-bit computers words, with 25 word multiplications. So, in devices with 64-bit word multiplications, the efficiency of these two primes may be similar.

Furthermore, in a context of exhaustive weakening, an adversary that has chosen malicious parameters by an exhaustive search will have a strong incentive to make the exhaustively weakened parameters to its enemies. One way to do this would be to spend great effort into optimizing the efficiency of the weakened parameters, but avoiding any optimizations of safer parameters. Such efforts could take the form of new efficiency algorithms, or new implementations, or even, if the adversary has such a great influence, new hardware which favors the weakened parameters in the sense of making them more efficient.

So, although efficiency is an important factor, its optimality is of limited utility in thwarting exhaustive weakening. Therefore, the much simpler criterion of decimal exponentiation complexity can be used if it does not hinder efficiency significantly.

At 108, the selected field size is used to generate an elliptic curve point. In an ECC scheme, elliptic curve points are generated based on an elliptic curve. An elliptic curve takes the form of: $y^2=x^3+ax+b$. In some cases, the coefficients, i.e., a and b, are selected to be compatible with the selected field size. For example, given a field size, the size of a particular elliptic curve may be prime or not prime, depending on the coefficients. In some cases, the coefficients are selected to have minimal compactness while keeping the size of the curve prime or almost prime. A curve size may be almost prime if it is a product of a cofactor (e.g., 4) and a prime. In one example, for the field size of 8^91+5, the elliptic curve equation $2y^2=x^3+x$ can be selected. This curve size has a cofactor of 72.

In some cases, a mapping function can be used to transform field elements into elliptic curve points, based on the selected elliptic curve equation. For the elliptic curve function $2y^2=x^3+x$, the mapping function can be represented by the following equation:

$$x = i - \frac{3i}{1 - ir^2}$$

where r represents a field element, i represents square root of −1 in the finite field, and x represents an x-coordinate of the elliptic curve point. One tries to form elliptic curve point (x, y) by plugging x into the elliptic curve function $2y^2=x^3+x$ and solving for y (by dividing the right hand side by two, and computing the square root). If no such y exists, add i to x (getting a new value x'=x+i for x.). For the new value x there is guaranteed to be existing y corresponding to point (x,y) on the curve.

In some cases, a pre-computation can be performed to determine whether it will be needed to add i. This helps to make the computation of x from r deterministic (and to take constant time).

For each x, there are two choices of y. Also, for each x, there are potentially two values of r below p/2 that give the same x. The choice of y can be used to encode which choice of r led to a given x, by choosing y based on whether it was needed to add i to x.

This construction can therefore be used to map an arbitrary 34-byte string into an elliptic curve point. This construction is also reversible. Some ECC protocols require this step of reversibly mapping arbitrary byte strings into elliptic curve points. A similar mapping can be achieved by trial-and-error, but it is not deterministic, which may weaken security.

At 110, the generated elliptic curve points are used in an ECC operation. Examples of the ECC operations include Elliptic Curve Integrated Encryption Scheme (ECIES), elliptic curve Diffie-Hellman (ECDH) key agreement scheme, Elliptic Curve Qu-Vanstone (ECQV) implicit certificate scheme, or other ECC schemes.

In some cases, following is an example of implementing the ECC schemes using the selected field size 8^91+5. Consider computer hardware that uses 64 bits to represent any integer x with $|x|<2^{63}$, i.e., a 64-bit signed integer. Two such integers x and y can be added by the hardware, provided that the result is also representable: if $|x+y|<2^{63}$. When $|x+y| \geq 2^{63}$, the computer hardware addition may overflow. Overflow might generate an error or may need to be handled using arithmetic modulo $2^{64}$. The simplified implementation can avoid overflow. Subtraction of 64-bit signed integers is similar.

The computer hardware can also multiply two 64-bit signed integers, yielding a 128-bit signed integer. The 128-bit signed integers may be internally represented as two 64-bit integers. The computer hardware, or the programming language of the implementation can realize addition and subtraction of these 128-bit signed integer (in the same way as 64-bit signed integers.). For example, a C compiler might implement 64-bit signed integers as type long and 128-bit signed integers as type long long.

Following is a field element representation. Vectors of five integers ($Z^5$) can be mapped to the finite field $F_p$ (of size $p=8^{91}+5$) by sending vector x to the dot product by using a radix (base) of $2^{55}$, see below:

$$x \cdot (1, 2^{55}, 2^{110}, 2^{165}, 2^{220}) \bmod p. \quad (12)$$

In other words, finite field elements can be represented in base $2^{55}$ (here base is also called the radix). More generally, it is useful to allow digits (also called limbs) to become negative, at least during intermediate calculations, to become considerably larger in absolute magnitude than $2^{55}$.

By linearity of the representation, conventional vector operations correspond to field operations, including addition, subtraction and scaling (by integers). Field elements can be represented as 5-tuples of 64-bit signed integers (natural computer words on a 64-bit machine). An exception is that during multiplication of field elements, an intermediate format 5-tuples of 128-bit signed integers can be used.

One way to multiply vectors x and y is with a cyclic convolution variant of schoolbook multiplication, where $z=xy$ has coordinates:

| $z_0 = x_0 y_0$ | $-20 x_1 y_4$ | $-20 x_2 y_3$ | $-20 x_3 y_2$ | $-20 x_4 y_1$, | (13) |
|---|---|---|---|---|---|
| $z_1 = x_0 y_1$ | $+x_1 y_0$ | $-20 x_2 y_4$ | $-20 x_3 y_3$ | $-20 x_4 y_2$, | (14) |
| $z_2 = x_0 y_2$ | $+x_1 y_1$ | $+x_2 y_0$ | $-20 x_3 y_4$ | $-20 x_4 y_3$, | (15) |
| $z_3 = x_0 y_3$ | $+x_1 y_2$ | $+x_2 y_1$ | $+x_3 y_0$ | $-20 x_4 y_4$, | (16) |
| $z_4 = x_0 y_4$ | $+x_1 y_3$ | $+x_2 y_2$ | $+x_3 y_1$ | $+x_4 y_0$. | (17) |

The following lemmas establish some conditions under which overflow does not occur when using the cyclic schoolbook formulas above.

If $|x_i|, |y_j| < 2^{60}$ for all i and j, then $|z_k| < 2^{127}$ for all k.

The next lemma may be helpful to optimize the multiplication of field elements by pre-multiplying $20x_i$, in other words computing $20x_i y_j$ as $(20x_i)y_j$. This may help optimize if $20x_i$ can be computed entirely with 64-bit integer operations.

If $|x_i| < 2^{58}$ for all i, then $|20x_i| < 2^{63}$ for all i.

The arithmetic operations described above tend to increase the magnitudes of the coordinates of the tuples. If this operation was iterated repeatedly, the entries in the tuples may overflow the computer hardware integers. So a reduction operation is used to avoid overflow.

A second type of reduction helps to give each field element a unique representation. These unique representations are useful at the final stages of ECC calculations to ensure interoperability, but they may not be necessary for the intermediate calculations.

In partial reduction, we only try to avoid overflow, and forgo uniqueness. Suppose $|z_i|<2^{127}$. Let $z_i = 2^{110} q_i + 2^{55} u_i + r_i$, with $|r_i|<2^{55}$ and $|u_i|<2^{55}$, and $|q_i|<2^{17}$. Let v be the vector with coordinates:

| $v_0 = r_0$ | $-20 u_4$ | $-20 q_3$, | (18) |
|---|---|---|---|
| $v_1 = r_1$ | $+u_0$ | $-20 q_4$, | (19) |
| $v_2 = r_2$ | $+u_1$ | $+q_0$, | (20) |
| $v_3 = r_3$ | $+u_2$ | $+q_1$, | (21) |
| $v_4 = r_4$ | $+u_3$ | $+q_2$. | (22) |

In some cases, the computer hardware can perform some of the additions above in parallel since the additions used to compute $v_i$ do not depend on the results of the additions used to compute $v_j$. The following lemma shows the reduced vectors v can be used in various arithmetic operations without overflow.

If $|z_i|<2^{127}$, then $|v_i|<2^{60}$.

In some cases, a further reduction of $v_0$, can be used. To that end, let $v_0 = 2^{55} s_0 + w_0$ with $|w_0|<2^{55}$, and $|s_0|<2^8$. Let:

$$w_0 = w_0, \quad (23)$$

$$w_1 = v_1 + s_0, \quad (24)$$

$$w_2 = v_2, \quad (25)$$

$$w_3 = v_3, \quad (26)$$

$$w_4 = v_4, \quad (27)$$

If $|z_i|<2^{127}$, then $|w_i|<2^{57}$.

A fully reduced vector w has $w_i \geq 0$, but each $w_i$ as small as possible. A unique representation is generally needed so that two parties, e.g., Alice and Bob, in the public key exchange system using ECC, can interoperate. If the computer hardware model can compute non-negative remainders of negative integers modulo powers of two, then the computer hardware can compute quotients and remainders starting from the least significant limb. The quotient from the most significant limb is scaled by −5 before being added to the least significant limb.

ECC operations also includes inversion in finite fields. For public values, some variant of extended Euclidean algorithm may be fast, but time varying. A variance in time depending on the secrets may be a potential weakness. A countermeasure is to use Fermat inversion, compute $x^{-1}$ as $x^{p-2}$.

Fermat inversion for the selected field size, $8^{91}+5$, has $p-2 = 8^{91}+3$. Computing $x^{p+2}$ is therefore fast by computing: $x^2, x^4, x^8, \ldots x^{273}, x^{273+2}, x^{p+2}$ where ellipsis indicates repeated squaring. This takes 273 squaring and 2 multiplications, which is nearly optimally efficient for modulus of this size. To compute square root, the method for primes with $p \equiv 3 \bmod 5$ can be used. The first step is to raise the field element to the power of $(p+5)/8 = 2^{270}+1$. This may involve repeated squaring operations. The power may be adjusted by multiplication by $\sqrt{-1}$ if the initial result is not a square root.

Below is some sample code that can be used for ECC implementations for the field size of 8^91+5.

```
typedef signed long long int i ;
typedef           i f[5];
#define FUN    inline void
```

-continued

```
#define FOR(S) {i j; for ( j =0; j <5; j += 1 ){ S ;}}
FUN add (f z, f x, f y){ FOR(z[j]= x[j]+y[j]);}
FUN sub (f z, f x, f y){ FOR(z[j]= x[j]-y[j]);}
FUN mal (f z, i s, f y){ FOR(z[j]= s *y[j]);}
typedef __int128 ii   ;      /* gcc 4.6+ */
typedef ii ff [5];
static FUN med (f z, ff zz)
{
# define QUA (x) ( x >>55)
# define MAD (x) (((((i)1) <<55) -1)& x)
# define Q(j)    QUA(QUA(zz[j]))
# define U(j)    MAD(QUA(zz[j]))
# define R(j)    MAD(zz[j])
  z[0] = R(0) - 20*U(4) - 20*Q(3);
  z[1] = R(1) +   U(0) - 20*Q(4);
  z[2] = R(2) +   U(1) +   Q(0);
  z[3] = R(3) +   U(2) +   Q(1);
  z[4] = R(4) +   U(3) +   Q(2);
  z[1] += QUA(z[0]);
  z[0] = MAD(z[0]);
}
FUN fix ( f x)
{
  i q,j;
# define FIX(j, r, k) \
  q    = x[j] >> r;\
  x[j]   -= q << r;\
  x[(j+1)%5] += q * k;
  for(j=0; j<2; j+=1){
    FIX(0, 55, 1);
    FIX(1, 55, 1);
    FIX(2, 55, 1);
    FIX(3, 55, 1);
    FIX(4, 53, -5);
  }
  q = (x[0]<0);
  x[0] += q * 5;
  x[4] += q << 53;
}
FUN mil (f z, i s, f y)
{
  ff zz ;
  FOR ( zz[ j] = s * ( ii) y[ j] );
  med ( z, zz) ;
}
# define CYC(M)\
  ff zz ;\
  zz[0] = M(0,0) - 20*M(1,4) - 20*M(2,3) - 20*M(3,2) - 20*M(4,1);\
  zz[1] = M(0,1) +   M(1,0) - 20*M(2,4) - 20*M(3,3) - 20*M(4,2);\
  zz[2] = M(0,2) +   M(1,1) +         M(2,0) - 20*M(3,4) - 20*M(4,3);\
  zz[3] = M(0,3) +   M(1,2) +         M(2,1) +   M(3,0) - 20*M(4,4);\
  zz[4] = M(0,4) +   M(1,3) +         M(2,2) +   M(3,1) +   M(4,0);\
  med ( z, zz );
FUN mul (f z, f x, f y)
{
# define MUL(j, k) x[ j] * ( ii) y[ k]
  CYC(MUL);
}
FUN squ (f z, f x)
{
# define SQR( j, k) x[ j] * ( ii) x[ k]
# define SQU( j, k) SQR ( j> k? j: k, j< k? j: k)
  CYC(SQU);
}
void inv ( f y, f x)
{
  f z ; i j;
  fix(x);
  squ(z,x) ;
  mul(y,x,z) ;
  for(j=2; j<=273; j+=1){squ(z,z);}
  mul(y,z,y);
}
```

Figure 2:
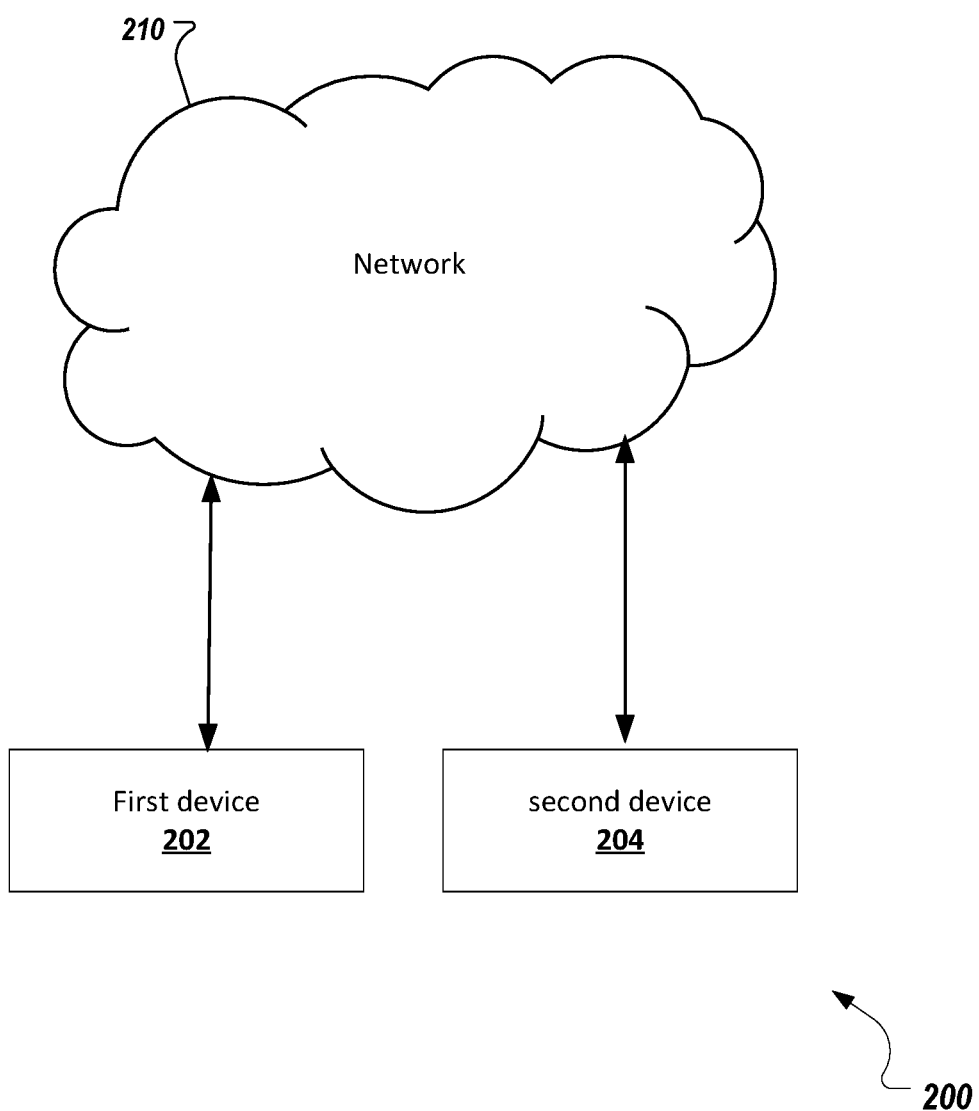
FIG. 2 is a schematic diagram showing an example ECC system, according to an implementation.

FIG. 2 is a schematic diagram showing an example ECC system 200 according to an implementation. At a high level, the example system 200 includes a first device 202 and a second device 204 that are communicatively coupled over a network 210.

The first device 202 and the second device 204 are electronic devices that use ECC schemes to secure communications. In one example, the first device 202 and the second device 204 can engage in a key exchange protocol, e.g., the elliptic curve Diffie-Hellman protocol. The first device 202 can generate a key pair using ECC. The key pair includes a private key d, which is a randomly selected integer, and a public key Q, where Q=dG, where G is a parameter of the Elliptic curve Diffie-Hellman (ECDH) system including a fixed point G on the elliptic curve. Alternatively, G might be obtained from 34-byte string which is the hash of a password shared between the two users. Therefore, the key pair of the first device 102 is $(d_1, Q_1)$, and the key pair of the second device 204 is $(d_2, Q_2)$.

The first device 202 transmits its public key $Q_1$ to the second device 204. The second device transmits its public key $Q_2$ to the first device 202. The first device 202 can compute elliptic curve point $(x,y)=d_1Q_2$, and the second device 204 can compute elliptic curve point $(x,y)=d_2Q_1$. (The points will be same because $d_1Q_2=d_1d_2G=d_2d_1G=d_2Q_1$.) The x-coordinate x of the point is a shared secret that is shared between the first device 202 and the second device 204. The first device 202 and the second device 204 can use x to encrypt and decrypt information transmitted between them. In some cases, these computations can be implemented using the implementation examples, e.g., the C code examples, described previously.

Turning to a general description, an electronic device, e.g., the first device 202 or the second device 204, may include, without limitation, any of the following electronic device: computing device, mobile device, mobile electronic device, user device, mobile station, subscriber station, portable electronic device, mobile communications device, wireless modem, wireless terminal, or other electronic device. Examples of a mobile device may include a cellular phone, personal data assistant (PDA), smart phone, laptop, tablet, personal computer (PC), pager, portable computer, portable gaming device, wearable electronic device, health/medical/fitness device, camera, or other mobile communications device having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," and "user device," can be used synonymously herein.

The example system 200 includes the network 210. The network 210 represents an application, set of applications, software, software modules, hardware, or combination thereof that can be configured to transmit data messages between the entities in the system 200. The network 210 includes a wireless network, a wireline network, or a combination thereof. For example, the network 210 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, or any other radio access technologies. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

Figure 3:
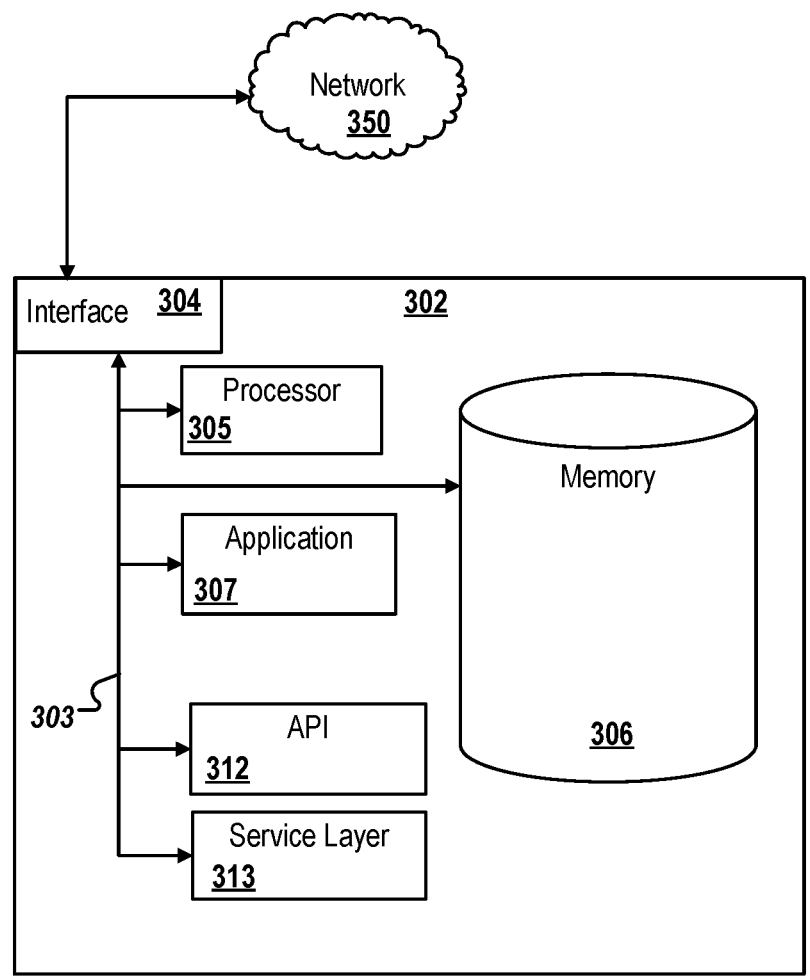
FIG. 3 is a high-level architecture block diagram showing an ECC device coupled with a network, according to an implementation.

FIG. 3 is a high-level architecture block diagram showing an ECC device 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the ECC device 302 and other devices. The network 350 can be a wireless or a wireline network, a memory pipe, a hardware connection, or any internal or external communication paths between the components.

The ECC device 302 includes a computing system configured to perform the algorithm described in this disclosure to generate elliptic curve points. For example, the ECC device 302 can be used to implement the first device 202 and the second device 204 shown in FIG. 2. In some cases, the algorithm can be implemented in an executable computing code, e.g., C/C++ executable codes. Alternatively, or in combination, the algorithm can be implemented in an application program, e.g., EXCEL. In some cases, the device 302 can include a standalone Linux system that runs batch applications. In some cases, the device 302 can include mobile or personal computers that run the application program.

The device 302 may include an input device, such as a keypad, keyboard, touch screen, microphone, speech recognition device, or another device that can accept user information, and/or an output device that conveys information associated with the operation of the device 302, including digital data, visual and/or audio information, or a GUI.

The device 302 can serve as a client, network component, a server, a database or other persistency, or the like. In some implementations, one or more components of the device 302 may be configured to operate within a cloud-computing-based environment.

At a high level, the device 302 is an electronic computing device operable to receive, transmit, process, store, or manage data and information. According to some implementations, the device 302 may also include or be communicably coupled with an application server, e-mail server, web server, caching server, streaming data server, business intelligence (BI) server, and/or other server.

The device 302 can receive requests over network 350 from a client application (e.g., executing on a user device) and respond to the received requests by processing the said requests in an appropriate software application. In addition, requests may also be sent to the device 302 from internal users (e.g., from a command console or by another appropriate access method), external or third parties, other automated applications, as well as any other appropriate entities, individuals, systems, or computers.

Each of the components of the device 302 can communicate using a system bus 303. In some implementations, any and/or all the components of the device 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the device 302. The functionality of the device 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or other suitable format. While illustrated as an integrated component of the device 302, alternative implementations may illustrate the API 312 and/or the service layer 313 as stand-alone components in relation to other components of the device 302. Moreover, any or all parts of the API 312 and/or the service layer 313 may be implemented as child or sub-modules of another software module, enterprise application, or hardware module, without departing from the scope of this disclosure.

The device 302 includes an interface 304. Although illustrated as a single interface 304 in FIG. 3, two or more interfaces 304 may be used according to particular needs, desires, or particular implementations of the device 302. The interface 304 is used by the device 302 for communicating with other systems in a distributed environment connected to the network 350—(whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or interface's hardware is operable to communicate physical signals.

The device 302 includes a processor 305. Although illustrated as a single processor 305 in FIG. 3, two or more processors may be used according to particular needs, desires, or particular implementations of the device 302. Generally, the processor 305 executes instructions and manipulates data to perform the operations of the device 302. Specifically, the processor 305 executes the functionality required for provisioning enterprise services. In some cases, the processor 305 can include a data processing apparatus.

The device 302 also includes a memory 306 that holds data for the device 302. Although illustrated as a single memory 306 in FIG. 3, two or more memories may be used according to particular needs, desires, or particular implementations of the device 302. While memory 306 is illustrated as an integral component of the device 302, in alternative implementations, memory 306 can be external to the device 302.

The application 307 is an algorithmic software engine providing functionality according to particular needs, desires, or particular implementations of the device 302, particularly with respect to functionality required for provisioning enterprise service. Although illustrated as a single application 307, the application 307 may be implemented as multiple applications 307 on the device 302. In addition, although illustrated as integral to the device 302, in alternative implementations, the application 307 can be external to the device 302.

Further, the terms "client," "user," and other appropriate terminology may be used interchangeably, as appropriate, without departing from the scope of this disclosure. Moreover, this disclosure contemplates that many users may use one device 302, or that one user may use multiple devices 302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media, transitory or non-transitory, suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A method for performing an encryption or decryption operation in a cryptographic system, comprising:
   selecting, by a hardware processor of a first electronic device, a field size that is one of $8^{91}+5$ or $8^{95}-9$;
   selecting, by the hardware processor of the first electronic device, a curve function that is compatible to the field size;
   transmitting, by the first electronic device, a first public key to a second electronic device;
   in response to the first public key, receiving, by the first electronic device, a second public key from the second electronic device;
   generating, by the hardware processor of the first electronic device, an elliptic curve point based on the second public key by using the selected field size;
   determining, by the hardware processor of the first electronic device, a shared secret based on the elliptic curve point and
   performing, by the hardware processor of the first electronic device, at least one of an encryption or a decryption operation based on the shared secret.

2. The method of claim 1, wherein the curve function is represented by $2y^2=x^3+x$.

3. The method of claim 2, wherein the elliptic curve point is generated using a mapping function represented by $$x_i = i - \frac{3i}{1-ir^2},$$

where r represent a field element, i represents an integer, and $x_i$ represents an x-coordinate of the elliptic curve point.

4. The method of claim 1, further comprising generating additional elliptic curve points using the selected field size.

5. A communication device, comprising:
   at least one hardware processor;
   a non-transitory computer-readable storage medium coupled to the at least one hardware processor and storing programming instructions for execution by the at least one hardware processor, wherein the programming instructions instruct the at least one hardware processor to:
      transmit a first public key to a second communication device;
      in response to the first public key, receive a second public key from the second communication device;
      generate an elliptic curve point based on the second public key by using a field size that is one of $8^{91}+5$ or $8^{95}-9$;
      determine a shared secret based on the elliptic curve point; and
      perform at least one of an encryption or a decryption operation based on the shared secret.

6. The communication device of claim 5, wherein the elliptic curve point is generated using a curve function represented by $2y^2=x^3+x$.

7. The communication device of claim 5, wherein the elliptic curve point is generated using a mapping function represented by $$x_i = i - \frac{3i}{1-ir^2},$$

where r represent a field element, i represents an integer, and $x_i$, represents an x-coordinate of the elliptic curve point.

8. The communication device of claim 5, wherein the programming instructions instruct the at least one hardware processor to generate additional elliptic curve points using the field size.

* * * * *

UNITED STATES PATENT AND TRADEMARK OFFICE
CERTIFICATE OF CORRECTION

PATENT NO. : 10,320,565 B2
APPLICATION NO. : 15/445888
DATED : June 11, 2019
INVENTOR(S) : Daniel Richard L. Brown It is certified that error appears in the above-identified patent and that said Letters Patent is hereby corrected as shown below:

In the Claims

Column 20, Line 32, In Claim 1, delete "point" and insert -- point; --, therefor.

Column 20, Line 45, In Claim 3, delete "represent" and insert -- represents --, therefor.

Column 21, Line 12, In Claim 7, delete "represent" and insert -- represents --, therefor.

Column 21, Line 13, In Claim 7, delete "$x_i$," and insert -- $x_i$ --, therefor.

Signed and Sealed this
Fifth Day of November, 2019

Andrei Iancu
*Director of the United States Patent and Trademark Office*